United States Patent [19]
Warren et al.

[11] Patent Number: 5,520,421
[45] Date of Patent: May 28, 1996

[54] FLUID TIGHT FLARE NUT SECURING ASSEMBLY

[75] Inventors: James Warren, Teaneck; John Lennon, Fair Lawn, both of N.J.

[73] Assignee: Lenwar, Inc., Teaneck, N.J.

[21] Appl. No.: 381,223

[22] Filed: Jan. 31, 1995

[51] Int. Cl.⁶ ..................................................... F16L 55/00
[52] U.S. Cl. ........................................ 285/89; 285/334.5
[58] Field of Search ........................... 285/89, 92, 334.5, 285/45, 175

[56] References Cited

U.S. PATENT DOCUMENTS

| | | | |
|---|---|---|---|
| 1,063,926 | 6/1913 | Schuermann | 285/175 X |
| 1,139,671 | 5/1915 | Goodall . | |
| 1,326,970 | 1/1920 | Row et al. | 285/89 |
| 1,639,407 | 8/1927 | Hutton . | |
| 1,776,797 | 9/1930 | Sheldon | 285/334.5 X |
| 1,872,536 | 8/1932 | Weatherhead | 285/334.5 X |
| 2,474,880 | 7/1949 | Woodling | 285/334.5 |
| 2,906,152 | 9/1959 | Brase | 285/175 X |
| 2,926,027 | 2/1960 | Marquis | 285/175 X |
| 3,362,731 | 1/1968 | Gasche et al. | 285/334.4 X |
| 3,586,351 | 6/1971 | Vanderveen et al. . | |
| 4,645,242 | 2/1987 | Coleman et al. . | |
| 4,930,543 | 6/1990 | Zuiches | 285/45 X |
| 5,127,679 | 7/1992 | Pouplier . | |
| 5,131,690 | 7/1992 | Mano . | |
| 5,188,398 | 2/1993 | Parimore, Jr. et al. . | |
| 5,350,200 | 9/1994 | Peterson et al. . | |

*Primary Examiner*—Dave W. Arola
*Attorney, Agent, or Firm*—W. Patrick Quast

[57] ABSTRACT

A fluid tight flare nut union is described. Flare nut unions are convenient to install in systems, such as refrigeration systems, and are generally reliably fluid tight. Leaks can occur over time, however, due to environmental stress conditions. Deformable ferrules, in combination with compression nut assemblies, either singly, or redundantly, or in counter rotation redundant assembly, secure the flare nut to the fluid transfer tubing in a locking relationship which prevents the loosening of the flare nut-flare connection with subsequent fluid leakage due to these environmental stresses. Enclosing the complete assembly in water proof insulating material, further insures virtually leak proof operation of the improved flare nut union.

10 Claims, 6 Drawing Sheets

FLUID TIGHT FLARE NUT SECURING ASSEMBLY

BACKGROUND

This invention relates to increasing the reliability of joints in fluid transfer devices, and in particular to flare nut unions in refrigeration systems.

Most present day refrigeration systems utilize fluorocarbon refrigerants (FREON) being pumped through copper tubing. Gaseous refrigerant is first condensed into a liquid in a condenser, then pumped through a thermostatic expansion valve and into an evaporator portion of the refrigeration system, the now vaporized liquid refrigerant now being pumped back through a compressor and into the condenser for liquefaction, and so on, on a continuous basis. The process is repeated many times a day, continuously over a period of months and years.

A ubiquitous problem with these refrigeration systems is that they tend to leak refrigerant at the joints within the system. Unions or joints which connect the refrigerant tubing to various components of the system are generally of two types: (1) soldered (welded) union; (2) flare nut union. While a properly installed soldered joint can have good reliability over a period of time, flare nut unions are often preferred. In the case of the flare nut union installation and repairs can be effected in a simplified manner in comparison to soldering, without high temperature melting of solders, which makes flare nut unions a popular option for many refrigeration installations and repair procedures.

As was mentioned above, the problem with any type of joint is the tendency to leak, especially over a period of time. The very nature of refrigeration systems favors the development of leaks. Refrigeration compressors tend to generate substantial vibration. In the case of thermostatic expansion valves the constant high pressures, high temperature to low temperature cycling of refrigerant favors loosening of a flare nut at this junction. In addition, refrigeration systems in automobiles and trucks subject refrigerant joints to obvious additional environmental causes for refrigerant leaks. While in the past there was some degree of tolerance to fluorocarbon refrigeration leakage, today with the high cost of these refrigerants and public concern over the ozone depletion of the earth's atmosphere, preventing refrigerant leakage has become a necessity.

In this regard it would obviously be desirable to have a highly reliable refrigerant tubing connection. Attempts have been made to devise reliable high pressure fluid joints as is evidenced by U.S. Pat. No. 4,645,242. In this Positive Lock High Pressure Mounting a bell-flared collar and compression nut assembly securing a fluid flow measuring device within a pipe is disclosed. In the event of high pressure disengagement of the collar and compression nut significant disengagement of the assembly is prevented by an annular rib (60) connected to the cylindrical body portion (18), an end cap (66) secured to the compression nut forming a stop for the annular rib in the event of the assembly becoming disengaged.

Again, in U.S. Pat. No. 5,350,200 a tube coupling assembly for connecting first and second fluid-carrying tubes together is disclosed. Disengagement of the assembly is prevented by a plurality of circumferentially spaced and axially extending resilient fingers protruding from a barrel portion of a ferrule, said fingers engaging circumferentially spaced and axially extending grooves within the barrel portion of a coupling nut. Similarly, in U.S. Pat. No. 5,188,398 a redundantly locked fluid coupling is disclosed which utilizes ratcheting teeth or sawtooth teeth in a circumferential surface of a coupling nut to prevent a disengagement of a fluid coupling. In U.S. Pat. No. 5,131,690 a self locking connector is disclosed which prevents disengagement between two fluid carrying tubular members by interposing a collar having longitudinal slots in its forward end between the tubing to be temporarily interconnected.

Additional coupling locking devices are disclosed in U.S. Pat. Nos. 5,127,679; 3,586,351, 1,639,407; and 1,139,671. In U.S. Pat. No. 5,127,679 a bushing with inner teething for locking a joint together is disclosed; U.S. Pat. No. 3,586,751 teaches locking nuts on a combination taper and standard threaded tube; U.S. Pat. No. 1,639,407 describes deformable grooves within a nut and bolt combination to effect a locking union; U.S. Pat. No. 1,139,671 discloses a locking union between two pipe threads in which the threads of one compression nut eventually distort within the threads of a second compression nut, effecting a locking of the joint.

While these various devices disclose useful fluid carrying joint connections they do not address the problem of providing a reliable flare nut union operating over a variety of environmentally induced stressful conditions.

It is therefore a principal object of the invention to provide a reliable, leak-free flare nut union.

A further object of the invention is to provide a leak-free flare nut assembly to replace existing flare nut installations.

An additional object of the invention is to provide a flare nut union with a redundant flare nut securing assembly.

Still another object of the invention is to provide a leak-free flare nut union compatible with existing flare nut installations.

Another object of the invention is to provide a low cost, economical, and easy to install leak-free flare nut union.

SUMMARY

These and other objects are accomplished with the fluid tight flare nut union securing assembly of the invention.

As discussed above a common problem in fluid transfer systems, and refrigeration systems in particular, is fluid leakage at joints within the system. This is a routine problem, often evident with the use of flare nuts to effect unions at these joints. Flare nuts have been found to be extremely useful, and generally reliable for these unions. The flare nut is usually configured to have a hexagonally shaped exterior to facilitate attachment of wrenches to thread the flare nut onto mating flare connections. The interior of the flare nut has a bore throughout to accommodate fluid transfer tubing, e.g. ½" O.D. copper tubing. Additionally the flare nut has internal flare threads. In practice a flared end is caused to be formed on one end of the fluid transfer tube, and the flare nut is slidably attached to this tube with the flared end portion of the tube forming a stop within the flare nut at the rear portion of the flare nut. The combination flare nut and tube is then threaded onto a flare connection, such as a flare connection on a refrigeration system expansion valve. The flare connection has matching external flare threads to the internal flare threads of the flare nut, with a matching frusto-conical, convex end portion (extending from the external threads to the beginning of the bore within the flare connection) to the concave, flared seating portion of the flared end of the tube. Threading the flare nut onto the flare connection causes the mating surfaces of the end of the flare connection and the seating portion of the end of the tube to be compressed against one another in a reliable, fluid sealing relationship. The typical fluid leakage problem that occurs, for example, in refrigeration systems, and particularly at thermostatic expansion joints within these systems, is due almost entirely to environmental stresses at such joints. In the case of the thermostatic expansion valve, liquid refrigerant is entering at high pressure, and then is expanding into a low pressure liquid at the flare nut union. The union is subjected to pressure differentials, and wide temperature variations between ambient down to −10 degrees F. to −20 degrees F. In addition to these stresses the union is being subjected to vibrations from the refrigeration compressor, automobile or truck motions, and so on. Further, any moisture gaining entrance to the union will undergo repeated conditions of freezing and thawing. The result of all of these environmental stresses often is to slowly cause the flare nut to rotate counter to the securing threaded engagement of the original connection, and therefore is caused to leak refrigerant or other fluids.

In the instant invention it has been discovered that standard hardware for effecting flare nut unions can be modified to virtually eliminate fluid leaks at such unions. For example, a tubular portion having a standard external compression thread can be affixed to the rear portion of a standard flare nut. Then securing a deformable ½" standard compression ferrule onto the fluid transfer tube by means of a standard compression nut having matching internal compression threads causes the ferrule to be partially deformed against the external surface of the tube and partially within the threads of the rear portion of the modified flare nut and the compression nut. The result is a flare nut union in which environmentally induced loosening of the flare nut and flare connection is prevented.

The invention can be made more convenient to use by fabricating a special flare nut-compression thread assembly, and special compression union for a rapid and redundant version of the invention. In this case the special assembly is constructed having a fluid transfer tube bore throughout, with internal flare threads at one end of the bore, and an internal compression thread at the other end of the bore. The special compression union has a hexagonally shaped center shoulder portion for convenient attachment of a wrench, and has external compression threads on left hand and right hand tubular protrusions on the compression union. Two deformable ferrules slide onto the tube, one between the special assembly and the left hand protrusion of the compression union, and the second ferrule between the right hand protrusion on the compression union and a standard compression nut having internal threads. Threading this complete assembly together onto a standard flare connection now forms a fluid tight flare nut union with extraordinary long term, fluid sealing characteristics.

An additional version of the invention disclosed involves the principal of counter rotation to firmly engage the flare nut union assembly in a leak-free assembly. In this case the flare nut is modified as described above to have a rearwardly extending tubular section having external compression threads. A standard compression nut is modified to have a rearward tubular extension having external counterclockwise threads. The assembly is now completed with two deformable ferrules and a compression nut having internal counterclockwise threads. The first ferrule is slidably attached to the tube between the rearward threads on the modified flare nut, and the modified compression nut, and the second ferrule is slidably attached to the tube between the rearward threads on the modified compression nut and the counterclockwise thread in the compression nut. Securing this assembly to a standard flare connection now provides a leak-free flare nut union wherein two deformed ferrules locked in opposite torquing relationship to one another on the fluid transfer tube, virtually eliminate fluid leakage due to environmental stresses on the flare nut union.

Thus it can be seen that the convenience of the flare nut union can be employed without the frequent leaks often encountered in the past by making use of the fluid tight flare nut assembly of the invention. While the preferred materials of fabrication of the various components of the invention would normally be brass or copper in order that thermal expansion and contraction characteristics of the assembly match typical flare connections, other materials such as steel or plastic can be employed. In the case of the aforementioned deformable ferrules it may be desirably to have them fabricated in rubber or synthetic elastomers, especially wherein other components of the invention are fabricated in plastic.

DETAILED DESCRIPTION

Figure 1:
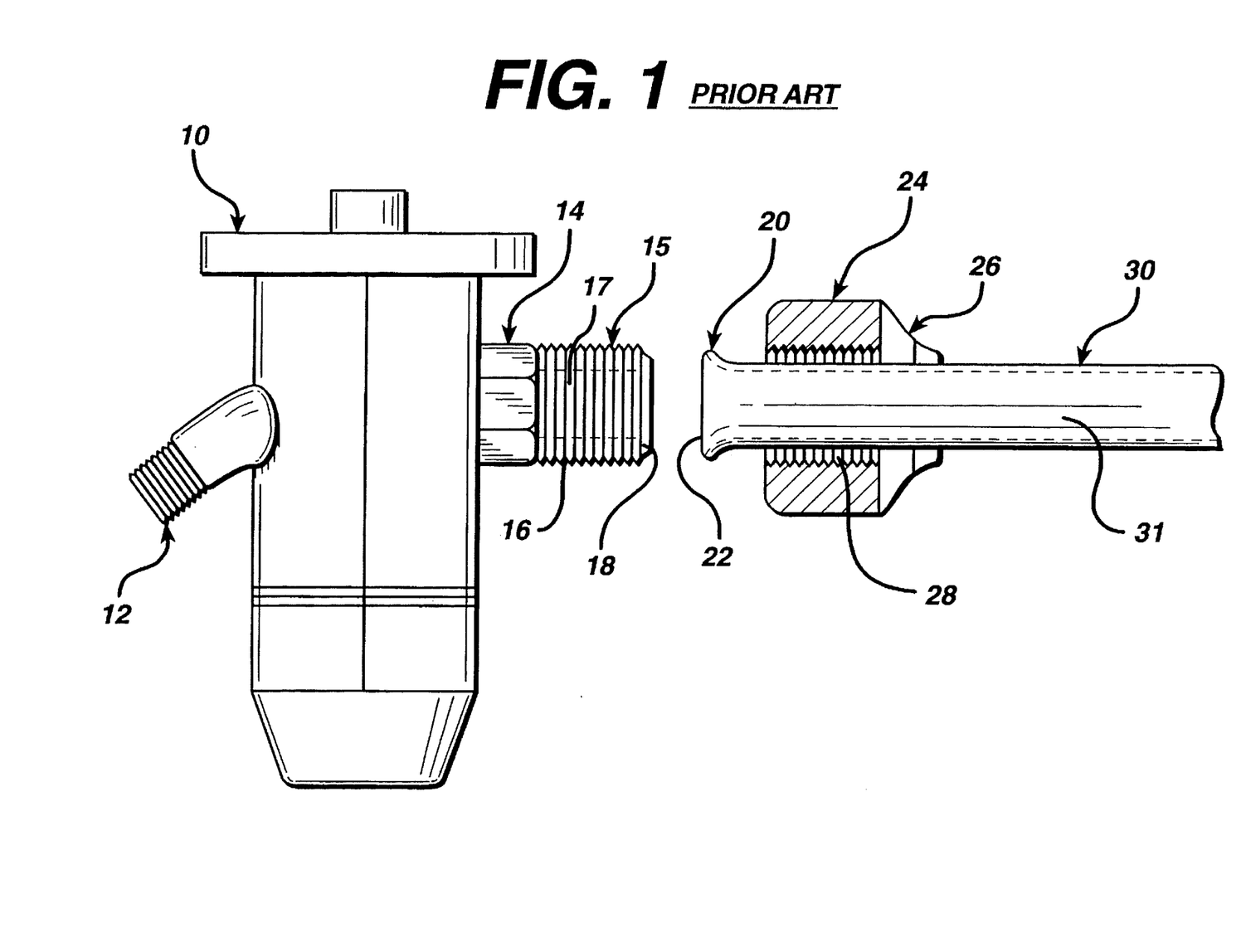
FIG. 1 is a side elevation, exploded sectional view of a typical flare nut union.

Turning now to the drawings in which similar structures having the same function are denoted with the same numerals, in FIG. 1 a typical flare nut 24, copper tube 30, and refrigeration system thermostatic expansion valve 10 assembly is illustrated. The expansion valve 10, which is a routine component of refrigeration systems, has a fluid inlet tube 12 and outlet tube 14. The outlet tube 14 usually has a threaded tubular extension 15 having a bore 17 therethrough communicating with the interior of the expansion valve and the bore 31 of the copper tube 30. This tubular threaded extension 15 has external flare threads 16 configured so as to match with the internal flare threads 28 of a typical flare nut 24. The end portion 18 of the threaded tubular extension 15 of the expansion valve is configured to have a frusto-conical, convex shape so as to match with the end 20 of the copper tube 30, said copper tube having this end flared outwardly by means of standard flaring tools (not shown) so as to have a mating concave surface 22 for the frusto-conical, convex end of the fluid exit threaded tubular extension of the expansion valve. Typical dimensions for such a flare nut union assembly would be ½" flare threads 16 on a the expansion valve, and ½" flare threads 28 for the flare threads within the flare nut 24, the copper tube having an O.D. of ½", and the flared end 20 of the copper tube being designated ½" flare, 45 degree SAE. The flare nut 24 itself has a bore throughout capable of receiving the copper tube, a typical rear ramp portion 26, and a hexagonally shaped exterior surface so as to conveniently accommodate wrenches for the purpose of securing the flare nut union securely together. With the flare nut slidably engaging the copper tube, the flare nut is threaded onto the threaded tubular extension of the expansion valve, causing the external surfaces 18, 22 of the end portions of the threaded tubular extension of the expansion valve and the flared end of the copper tube to come together in a fluid sealing relationship. Typically, the threaded tubular extension of the expansion valve 15 and the flare nut are fabricated in brass or copper in order to have similar thermal expansion and contraction characteristics. This typical flare nut union assembly depicted in FIG. 1 will provide a generally reliable fluid tight seal for a variety of fluid transfer procedures. However, the environmental extremes of high pressure, thermal expansion and contraction, vibration, and freeze-thawing of moisture trapped within the union, over time tends to reverse the original torquing motion applied to secure the union, causing the union to loosen with resultant fluid leakage. This common problem is answered by the structures described below.

Figure 2:
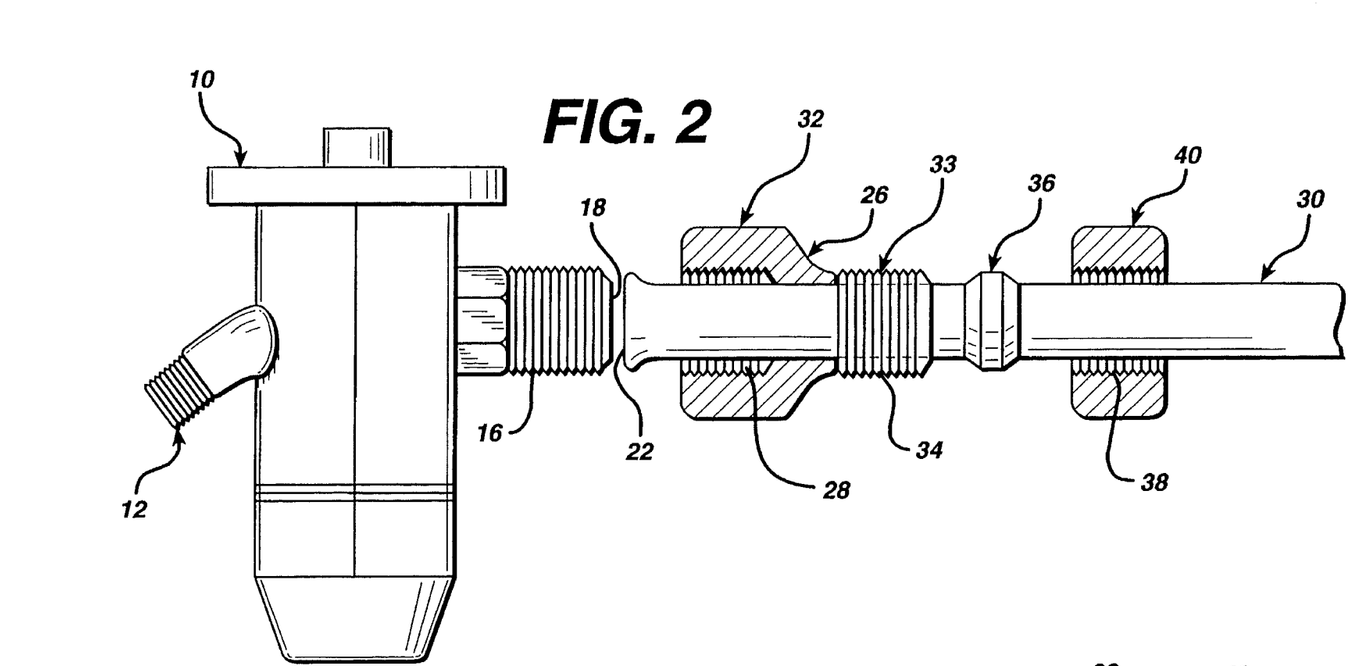
FIG. 2 is a side elevation, exploded sectional view of one version of the invention, showing a modified flare nut with external compression threads.

In FIG. 2 a version of the fluid tight flare nut union of the invention is depicted. The standard flare nut 24 of FIG. 1 is shown modified 32 so as to have a standard ½" compression thread 34 on the external surface of a tubular section 33 extending from the rear of the flare nut 32. Sliding a standard ½" compression ferrule 36 onto the tube 30, followed by sliding a ½" standard compression nut 40 onto the tube, said compression nut 40 having internal ½" compression threads 38, completes the hardware components for this version of the invention. Typically, this hardware is fabricated in brass or copper. After the flare nut 32 has been secured to the threaded tubular extension 15 of the expansion valve as explained for FIG. 1, the compression nut 40 is threaded over the external threads 34 on the flare nut, which causes the deformable ½" copper ferrule 36 to be partially deformed onto the external surface of the copper tube 30, and within the threads 38 of the compression nut and the beginning of the threads 34 on the flare nut tubular extension 33. The completed union as best envisioned in FIG. 5, can now be covered (not shown) with a suitable water proofing and insulating material, as, for example, styrofoam. The combination of the compression threads 34 on the flare nut, together with the secured compression nut 40 and deformed ferrule 36, now act to lock the flare nut union in place, and to prevent any loosening of this union which might occur over time.

Figure 2A:
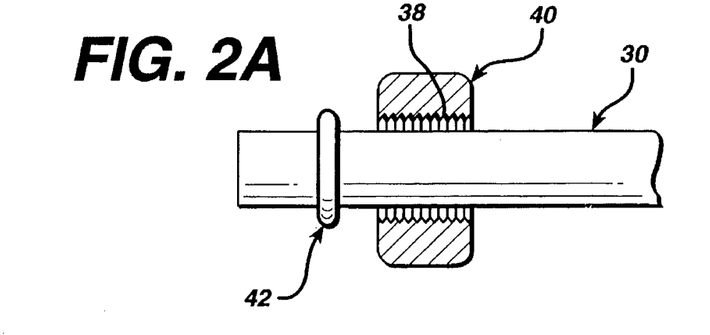
FIG. 2A illustrates utilizing an elastomeric O ring in place of the metal ferrule shown in FIG. 2.

FIG. 2A illustrates a second embodiment of the invention in which the metal (copper) ferrule 36 of FIG. 2 is replaced with a rubber or synthetic elastomer "O" ring 42. This type of construction would be suitable wherein the flare nut union assembly components of the invention were fabricated in a suitable plastic, or metal reinforced plastic material, instead of metal as previously described.

Figure 3:
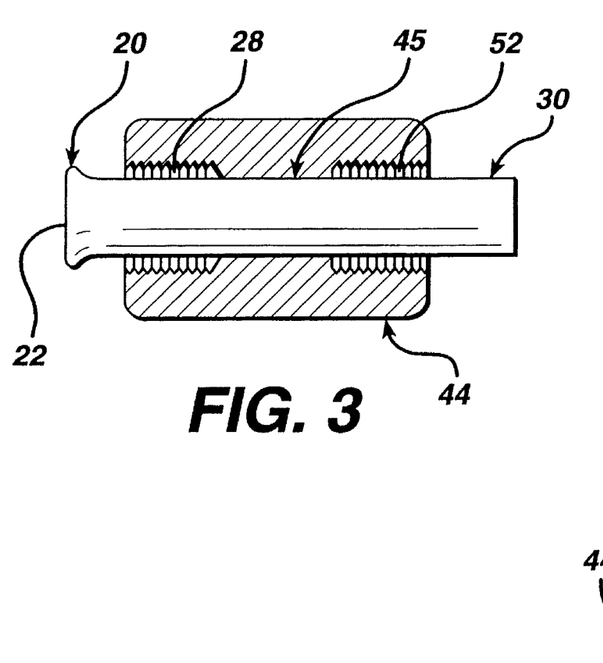
FIG. 3 is a perspective, sectional view of a combination flare nut-compression thread assembly of the invention in place on a fluid transfer tube.
Figure 3A:
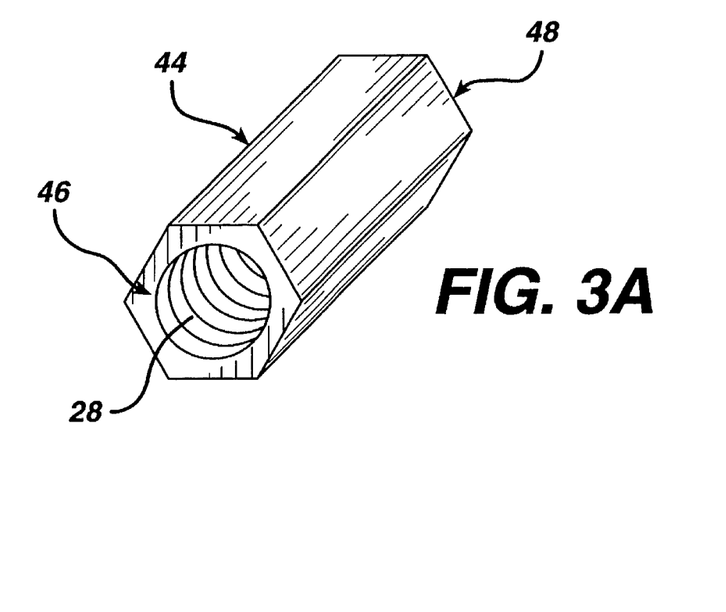
FIG. 3A is a perspective view of the assembly of FIG. 3, illustrating the internal flare threads of the assembly.
Figure 3B:
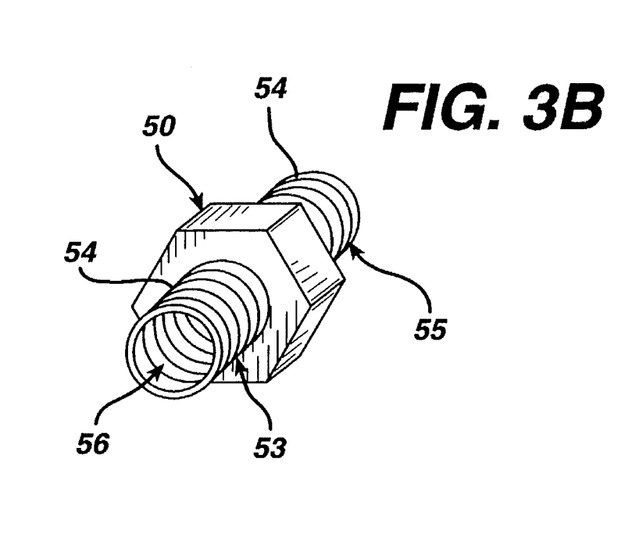
FIG. 3B is a perspective view of a special compression union utilized on one version of the invention.

In FIG. 3, 3A, and 3B a specially fabricated combination flare nut-compression thread assembly 44 is depicted. The assembly 44 has an hexagonal exterior shape as best seen in FIG. 3A for facilitating the attachment of standard wrenches. The assembly 44 is preferably fabricated in brass or copper, and has a bore 45 throughout for accommodating a copper tube 30. The assembly 44 has a standard ½" internal flare thread 28 at one end 46, and a standard ½" internal compression thread 52 in its other end 48. FIG. 3B depicts a specially fabricated compression union 50, having an hexagonal shape on its external surface to simplify wrench attachment, and having a left hand tubular extension 53, said left hand tubular extension having standard ½" external compression threads 54 on its external surface, and having a right hand tubular extension 55, said right hand tubular extension having standard ½" external compression threads 54, and having a bore 56 throughout both said left and right hand tubular extensions for slidably engaging the copper tube.

Figure 4:
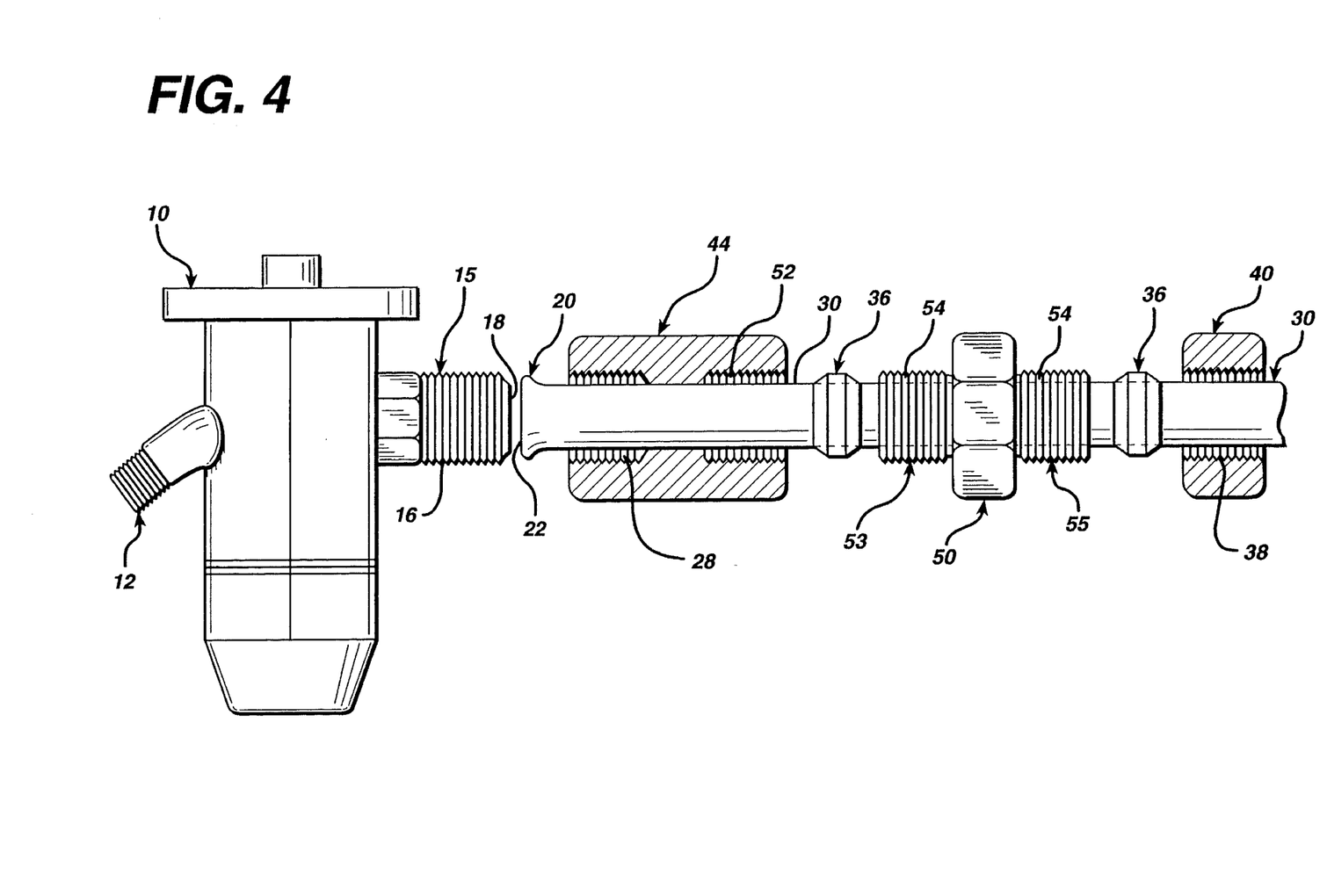
FIG. 4 is a side elevation, exploded sectional view of one version of the invention, illustrating a redundant locking feature of the invention.

FIG. 4 depicts the completed assembly of FIGS. 3, 3A, and 3B now including ferrules 36, just before threadably connecting the components of the invention together to form the fluid tight flare nut union of this version of the invention. The flare nut-compression thread assembly 44 is shown with the copper tube 30 within the assembly bore 45, with the flared end 20 of the tube juxtaposed for mating connection to the end 18 of the threaded tubular extension 15 of a refrigerant expansion valve 10. A first ½" copper compression ferrule 36 is shown in place on the tube 30 between the internal compression threads 52 within the assembly 44 and the left hand tubular extension 53 of the compression union 50, and a second ½" copper compression ferrule 36 is shown in place between the right hand tubular extension 55 of the compression union 50 and a ½" standard compression nut 40.

Figure 5:
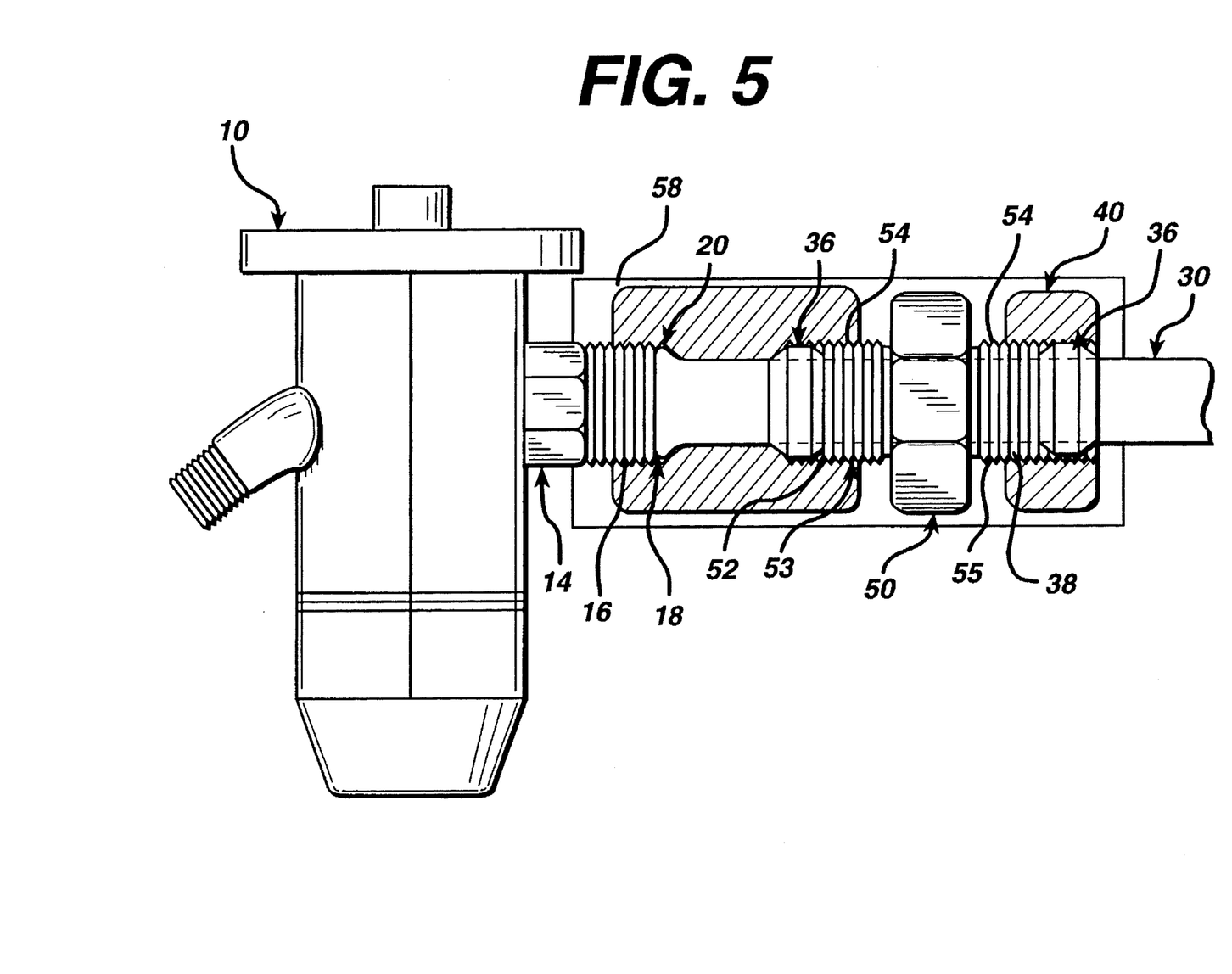
FIG. 5 is a side elevation, sectional perspective view of the flare nut union assembly of FIG. 4 as being threadably secured together, and waterproofed and thermally insulated.

FIG. 5 illustrates the components of FIG. 4 now securely threaded together to form a fluid tight flare nut union version of the invention. As clearly shown in FIG. 5, the flared end 20 of the tube 30 is now secured in a fluid tight relationship with the end 18 of the threaded tubular extension of the expansion valve. Loosening of this joint is virtually precluded due to the redundant locking effect of the two ferrules 36 along the length of the assembly. The first ferrule 36 is now shown having been partially deformed onto the external surface of the tube, and within the internal compression threads 52 of the assembly 44, and being compressed by the left hand tubular extension 53 of the compression union at the beginning of the bore 56 in this tubular extension, while the second ferrule is shown having been partially deformed onto the external surface of the tube 30, and within the internal compression threads 38 of the standard compression nut 40, being compressed between the opening to the bore in the right hand tubular extension 55 of the compression union, and the compression nut 40. With the deformable ferrules firmly locking the flare nut-compression thread assembly 44 firmly in place on the tube in this redundant fashion, reverse motion of the flare nut union due to environmental stresses is virtually precluded. In addition the entire flare nut union is shown enclosed in a waterproof insulator 58 so that freeze-thaw effects of trapped moisture is eliminated from the joint.

Figure 6:
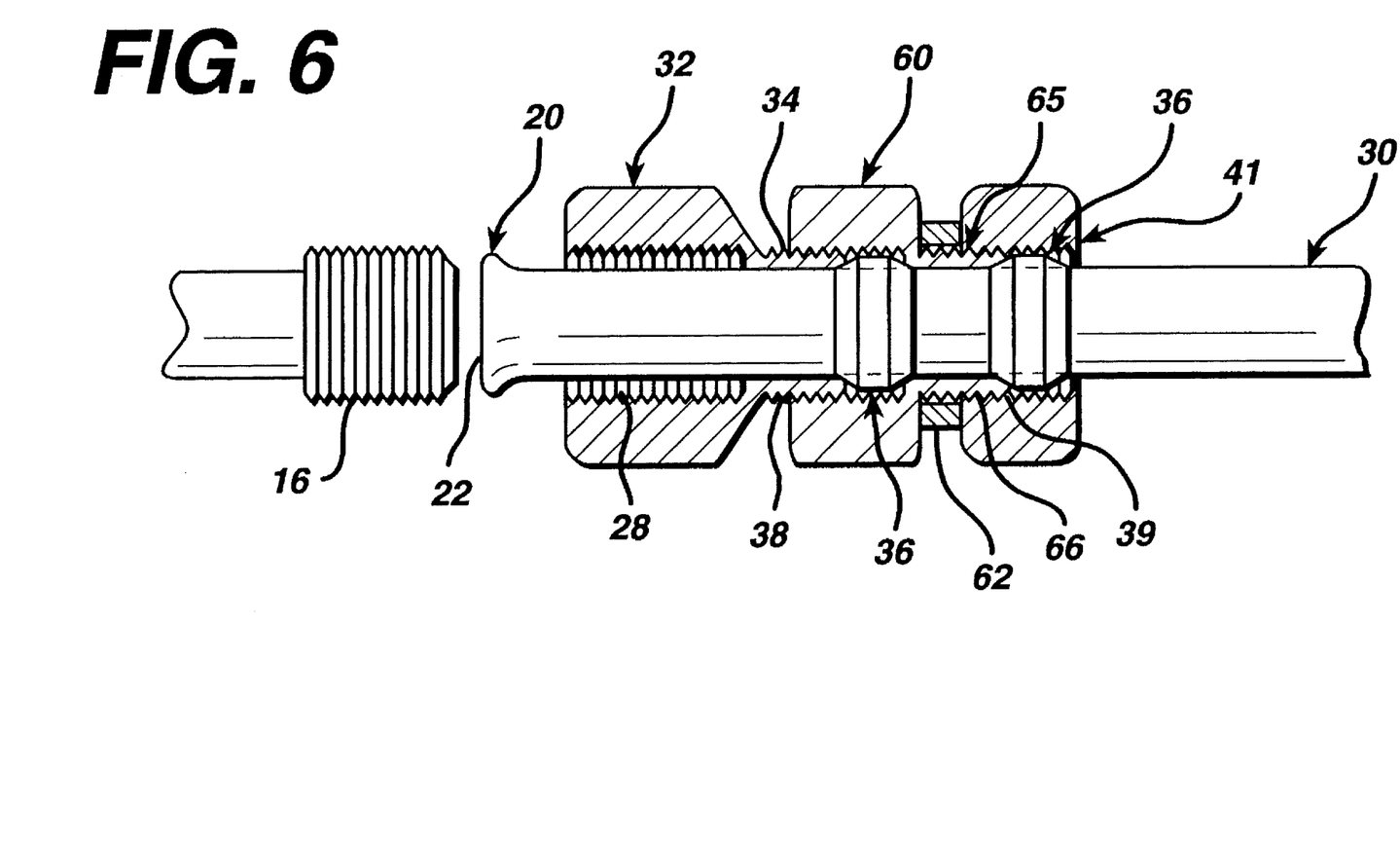
FIG. 6 is a side elevation, partially exploded, sectional view of one version of the invention, illustrating the principal of counter rotating locking mechanisms of the invention.

Another version of the invention is illustrated in FIG. 6. The standard ½" compression nut 40 depicted in FIG. 1 is now shown as a modified first compression nut 60 having a rearwardly extending tubular portion 65, said rearwardly extending tubular portion having "right hand" compression threads 66 (i.e. compression threads threading in a counterclockwise motion to the clockwise motion of, for example, the external compression threads 34 on the rear extension on the flare nut 32, and the internal compression threads 38 within this modified first compression nut 60) on its external surface. A second modified compression nut 41 has matching "right hand" internal compression threads 39 to these external "right hand" compression threads. A first ferrule 36 is attached in the same manner as illustrated in FIG. 2, but now securing a second ferrule 36 between a washer 62 positioned on the external compression threads on the first modified compression nut 60, and the second modified compression nut 41, now provides a uniquely redundant counter rotation locking mechanism to virtually preclude loosening of the flare nut 32 due to environmental conditions while it is secured to the flare connection.

Thus a unique, fluid tight flare nut union is disclosed which virtually eliminates the fluid leak problems common heretofore with this useful union. Installation of the invention is performed economically and with unusual ease and efficiency. The invention has been described with specific structures, but is obviously useful over a wide range of tubing sizes, differing thread sizes, and so on. The assembly has been described as being fabricated in brass or copper, but, of course, can be fabricated in other suitable metals, plastic-metal combinations, or plastic. The fluid tight flare nut union of the invention is described in use in refrigeration system, but, of course, can be employed in a wide number of analogous fluid transfer systems.

While the present invention has been disclosed in connection with versions shown and described in detail, various modifications and improvements thereon will become readily apparent to those skilled in the art. Accordingly, the spirit and scope of the present invention is to be limited only by the following claims.

What is claimed is:

1. A flare nut union securing assembly for connection of a first tube having a flared, concave end to a second tube having a mating frusto-conical, convex end, said assembly comprising:

(a) a flare nut having a bore therethrough for slidably engaging said first tube;

(b) a first end of said flare nut having internal threads for threadably securing said first end of said flare nut to external threads on said second tube;

(c) a second end of said flare nut having a longitudinally extending cylindrical portion of said flare nut, said longitudinally extending cylindrical portion of said flare nut including a first compression thread extending the entire length of said longitudinally extending cylindrical portion to its open end, said open end having a compression union termination, configured to coact with a tapering end of a deformable member;

(d) a deformable member having a bore therethrough for slidably engaging said first tube and including first and second tapered ends; and (e) a compression nut having a bore therethrough for slidably engaging said first tube, said compression nut including internal compression threads extending the length thereof to its closed end, said closed end including a respective compression union termination for coacting with a tapered end of a deformable member, so that when said first tube is slidably engaged within said bore of said flare nut with said flared end of said first tube facing the opening to said first end of said flare nut, and said deformable member being slidably engaged on said first tube between said second end of said flare nut and said compression nut, and said compression nut being slidably engaged on said first tube, and when said internal threads within said flare nut are threaded onto said external threads of said second tube the external surfaces of said flared concave end of said first tube and said frusto-conical convex end of said second tube are secured together in a fluid tight relationship, and when said internal threads within said compression nut are threaded onto said first compression threads of said longitudinally extending cylindrical portion of said flare nut, said first tapered end of said deformable member is caused to coact in a sealing manner with the compression union termination of said open end of said longitudinally extending cylindrical portion, and said second tapered end of said deformable member is caused to coact in a sealing manner with the compression union termination at said closed end of said compression nut and said deformable member is caused to compressively seal against the internal threads within said compression nut, such that said deformable member is caused to be deformed against the external surface of said first tube, and that movement of said flare nut and said second tube in the reverse order of said threaded engagement of said flare nut and said second tube, which might occur due to environmentally induced conditions, is prevented.

2. The flare nut union securing assembly according to claim 1 wherein said deformable member is fabricated in metal.

3. The flare nut union securing assembly according to claim 1 wherein said deformable member is an elastomeric "O" ring and wherein said compression nut and said longitudinally extending cylindrical portion of said flare nut, at least, are made of material from a group consisting essentially of non-metal material and metal reinforced material.

4. The flare nut union securing assembly according to claim 3 wherein said non-metal material and the material reinforced by metal, is plastic.

5. The flare nut union securing assembly according to claim 1 wherein said assembly is fabricated from a metal selected from the group consisting of copper and brass.

6. The flare nut union securing assembly according to claim 1 further comprising said assembly being covered with a waterproof material.

7. The flare nut union securing assembly according to claim 6 further comprising said assembly being encased in a thermally insulating material.

8. The flare nut union securing assembly according to claim 1, further comprising:

said internal threads on said compression nut being characterized as right hand threads, said compression nut having a longitudinally extending tube section, said longitudinally extending tube section having external threads characterized as left hand external threads, a second compression nut having a bore therethrough for slidably engaging said first tube, said second compression nut having internal threads characterized as left hand threads, a washer having a bore therethrough for slidable engagement on said first tube, said washer being positioned at a shoulder portion of said compression nut adjacent the beginning of said longitudinally extending tube section and said second compression nut, and a second deformable member being positioned between said washer and said second compression nut, so that when said right hand internal thread on said compression nut is threadably secured to said external threads on said flare nut, and said left hand internal threads in said second compression nut are threadably secured to said left hand external threads on said longitudinally extending tubular portion of said compression nut, said second deformable member is caused to be deformed against the external surface of said first tube so that possible disengagement of said flare nut and said second tube due to environmental conditions is further prevented.

9. A flare nut union securing assembly for connection of a first tube having a flared, concave end to a second tube having a mating frusto-conical, convex end, said assembly comprising:

(a) a first connector element having a bore therethrough for slidably engaging said first tube;

(b) said first connector element having a first end having internal threads for threadably securing said first end of said first connector element to external threads on said second tube;

(c) a second end of said first connector element having internal compression threads extending from the open end of said second end to an interior end having a compression union termination;

(d) a first ferrule having a bore therethrough for slidably engaging said first tube and including first and second chamfered ends;

(e) a second connector element having a bore therethrough for slidably engaging said first tube, said second connector element having external compression threads on a left hand tubular cylindrical portion of said second connector, said left hand tubular cylindrical portion having an open end, the open end of said left hand tubular cylindrical portion having a compression union termination, configured to coact with a chamfered end of a ferrule, so that when said first tube is slidably engaged within said bore of said first connector with said flared end of said tube facing the opening to said first end of said first connector element, and said first ferrule being slidably engaged on said first tube between said first connector and said second connector element, and said second connector element being slidably engaged on said first tube, and when said first end internal threads of said first connector element are threaded onto said external threads of said second tube the external surfaces of said flared concave end of said first tube and said frusto-conical convex end of said second tube are secured together in a fluid tight relationship, and when said external compression threads on said left hand tubular cylindrical portion of said second connector element are threaded into said second end having internal compression threads of said first connector element, said first chamfered end of said ferrule is caused to coact in a sealing manner with the compression union termination of said open end of said left hand tubular cylindrical portion, and said second chamfered end of said ferrule is caused to coact in a sealing manner with the compression union termination at said interior end of said second end and said ferrule is caused to compressingly seal against the internal threads within said second end of said first connector element and said first ferrule is caused to be deformed against the external surface of said first tube, so that movement of said first connector element and said second tube in the reverse order of said threaded engagement of said first connector element and said second tube, which might occur due to environmentally induced conditions, is prevented.

10. A flare nut union securing assembly according to claim 9, further comprising:

(a) said second connector element having external compression threads on a right hand tubular cylindrical portion of said second connector said right hand tubular cylindrical portion having an open end;

(b) a second ferrule having a bore therethrough for slidably engaging said first tube and including third and fourth chamfered ends;

(c) a compression nut having a bore therethrough for slidably engaging said first tube, said compression nut having internal compression threads extending from its open end to an interior end having a compression union termination, so that when said first tube is slidably engaged within said bore of said first connector with said flared end of said tube facing the opening to said first end of said first connector element, and said first ferrule being slidably engaged on said first tube between said first connector and said second connector element, and said second connector element being slidably engaged on said first tube, and said second ferrule being slidably engaged on said first tube between said second connector element and said compression nut, and said compression nut being slidably engaged on said first tube, and when said first end internal threads of said first connector element are threaded onto said external threads of said second tube the external surfaces of said flared concave end of said first tube and said frusto-conical convex end of said second tube are secured together in a fluid tight relationship, and when said external compression threads on said left hand tubular cylindrical portion of said second connector element are threaded into said second end having internal compression threads of said first connector element, and said external compression threads on said right hand tubular cylindrical portion of said second connector element are threaded into said internal compression threads of said compression nut, said first, second, third and fourth chamfered ends of each of the respective ferrules is caused to coact in a sealing manner with the cooperating compression union termination of respectively the open end of each said right and left tubular cylindrical portions, and the compression union termination at the interior end of said open end of said second end and said compression nut and said ferrules are caused to compressively seal against the internal threads within said second end of said first connector and said compression nut, respectively, such that said first and said second ferrules are caused to be deformed against the external surface of said first tube, so that movement of said first connector element and said second tube in the reverse order of said threaded engagement of said first connector element and said second tube, which might occur due to environmentally induced conditions, is further prevented.

* * * * *